United States Patent
Durbin et al.

(10) Patent No.: US 10,428,965 B1
(45) Date of Patent: Oct. 1, 2019

(54) DIGITAL FLOW CONTROL VALVE FOR CURING PRESS

(71) Applicant: Durbin Industrial Valve Repair, Inc., Akron, OH (US)

(72) Inventors: Scott Durbin, Uniontown, OH (US); Braden Westfall, Massillon, OH (US); Jason Paquette, Uniontown, OH (US)

(73) Assignee: Durbin Industrial Valve Repair, Inc., Akron, OH (US)

( * ) Notice: Subject to any disclaimer, the term of this patent is extended or adjusted under 35 U.S.C. 154(b) by 106 days.

(21) Appl. No.: 15/496,618

(22) Filed: Apr. 25, 2017

Related U.S. Application Data

(60) Provisional application No. 62/327,098, filed on Apr. 25, 2016.

(51) Int. Cl.
  *F16K 17/36* (2006.01)
  *F16K 31/04* (2006.01)
(52) U.S. Cl.
  CPC ............ *F16K 17/36* (2013.01); *F16K 31/047* (2013.01)
(58) Field of Classification Search
  None
  See application file for complete search history.

(56) References Cited

U.S. PATENT DOCUMENTS

| | | | |
|---|---|---|---|
| 3,918,861 A | 11/1975 | Klose | |
| 4,344,142 A | 8/1982 | Diehr, II et al. | |
| 5,102,319 A | 4/1992 | Hamilton et al. | |
| 5,316,458 A | 5/1994 | Lesneski | |
| 6,158,998 A | 12/2000 | Irie | |
| 6,401,524 B1 | 6/2002 | Incavo et al. | |
| 8,636,262 B2* | 1/2014 | Schade | F16K 31/048 251/129.19 |
| 2011/0115319 A1* | 5/2011 | Schade | F16K 31/047 310/83 |
| 2015/0369001 A1* | 12/2015 | Hoang | F16K 3/0254 166/250.01 |
| 2016/0169401 A1 | 6/2016 | Williams et al. | |

* cited by examiner

*Primary Examiner* — Jessica Cahill
*Assistant Examiner* — Daphne M Barry
(74) *Attorney, Agent, or Firm* — Standley Law Group LLP

(57) ABSTRACT

A flow control device (10) operates on digital instruction from a controller, especially in association with a tire curing press. A valve body (42) has a flow conduit, along which a seat (52) is formed. A valve stem (48) has a valve seal (50) positioned in the flow conduit and an end that extends out of the valve body at a valve bonnet (54). The seal move toward and away from the valve seat. A smart motor (20) in bi-directional communication with the controller sets the position of the seal by rotating an output shaft (22) to a predetermined position. An actuator (7) arranged between the stepper motor and the valve body translates rotation of the outlet shaft into axial movement of the valve stem. A spring (76) in the actuator moves the valve stem to a predetermined default position in the event of loss of power.

5 Claims, 3 Drawing Sheets

DIGITAL FLOW CONTROL VALVE FOR CURING PRESS

CROSS-REFERENCE TO RELATED APPLICATIONS

This application is a non-provisional of, and makes a claim of priority to, U.S. provisional patent application 62/327,098, filed on 25 Apr. 2016, which is incorporated by reference as if fully recited herein.

TECHNICAL FIELD

The disclosed embodiments of the present invention relate to a valve for controlling fluid flow, typically, a gas flow. More specifically, the valve is operated under the control of a digital signal sent to a stepping motor, which not only receives input from, but also provides feedback to, a controller. Even more specifically, some embodiments of the valve are used in rubber curing presses, to control the flow of pressurized steam.

BACKGROUND OF THE ART

In the production of products from rubber, it is necessary to cure or "vulcanize" the uncured rubber product under timed conditions of temperature and pressure. The accurate and automatic control of rubber-curing presses is a desired result.

In the rubber-molding art, there are a number of producers of the presses and, in general, the presses are substantially the same in terms of the physical equipment provided. However, the production of the rubber products is very individualized, not only between the companies that produce the products, but also within the product line. For example, a tire company will vary its formula for the operation of the press depending upon the intended lifetime (in terms of miles) of the tire.

It is well-known in the art to provide direct digital control of the rubber molding press. A notable point in this art is U.S. Pat. No. 4,344,142, to Diehr in 1982, which introduced the concept of providing thermocouple data from inside the mold to a computer tasked with controlling the operation of the mold. In the computer, a time-temperature relationship from physical chemistry was applied to the thermocouple data to monitor the time elapsed since the mold was closed and to re-calculate, in real time, the time remaining until a desired cure has been achieved, at which point the mold is automatically opened and the cured product removed.

In the rubber-molding art, as exemplified by U.S. Pat. No. 6,158,998 to Irie, the heat and pressure are supplied by a "heating/pressurizing medium" that is supplied to the interior of the mold in which the product is contained. Those of skill in this art will quickly recognize that the most commonly used "heating/pressurizing medium" is steam.

Improvements in the curing models implemented in the control computer and the ability to monitor mold temperature and pressure are limited, however, so long as precise control of the "heating/pressurizing medium" is not available. The current manner of managing steam flow to the mold is by pneumatic control of a valve, using compressed air.

It is therefore an unmet advantage of the prior art to provide a control of the heating/pressurizing medium for a rubber-molding press in a digital manner.

SUMMARY OF THE INVENTION

This and other unmet advantages are provided by a flow control device, arranged for bi-directional communication with a controller. The flow control device has a valve body, a smart motor and an actuator.

The valve body has a fluid input and a fluid output to define a flow conduit therethrough. A seat is formed along the flow conduit. A valve stem has a first end positioned inside the valve body in the flow conduit and a second end that extends out of the valve body, typically at a valve bonnet that seals the flow conduit. A seal is arranged at the first end of the valve stem for movement toward and away from a sealing relationship with the valve seat.

The smart motor is in bi-directional digital communication with the controller to receive an input signal for setting the position of the seal relative to the valve seat and to send output signals to the controller. The smart motor acts to rotate an output shaft with a gear to a position determined by the input signal.

The actuator has a housing and is arranged between the stepper motor and the valve body to translate rotation of the outlet shaft into axial movement of the valve stem against a biasing force provided a spring arranged to move the valve stem to a predetermined default position in the event of loss of power to the stepper motor.

In some embodiments, the actuator comprises an actuator shaft having a gear that engages the output shaft gear and rotates the actuator shaft.

In some embodiments, the actuator also comprises a bushing, positioned in the actuator housing with a shape to allow axial movement and to resist rotation of the bushing in the housing. This bushing uses a recirculating ball nut that engages the actuator shaft, with the recirculating ball nut locked into the bushing by a pair of ball nut flanges.

The actuator is engaged to the valve stem through the bushing, preferably using a quick-connect connection.

In some embodiments, the spring biases the valve stem by directly acting on the bushing in the actuator housing.

BRIEF DESCRIPTION OF THE DRAWINGS

A better understanding of the disclosed embodiments will be obtained from a reading of the following detailed description and the accompanying drawings wherein identical reference characters refer to identical parts and in which.

DETAILED DESCRIPTION OF A PREFERRED EMBODIMENT

Figure 1:
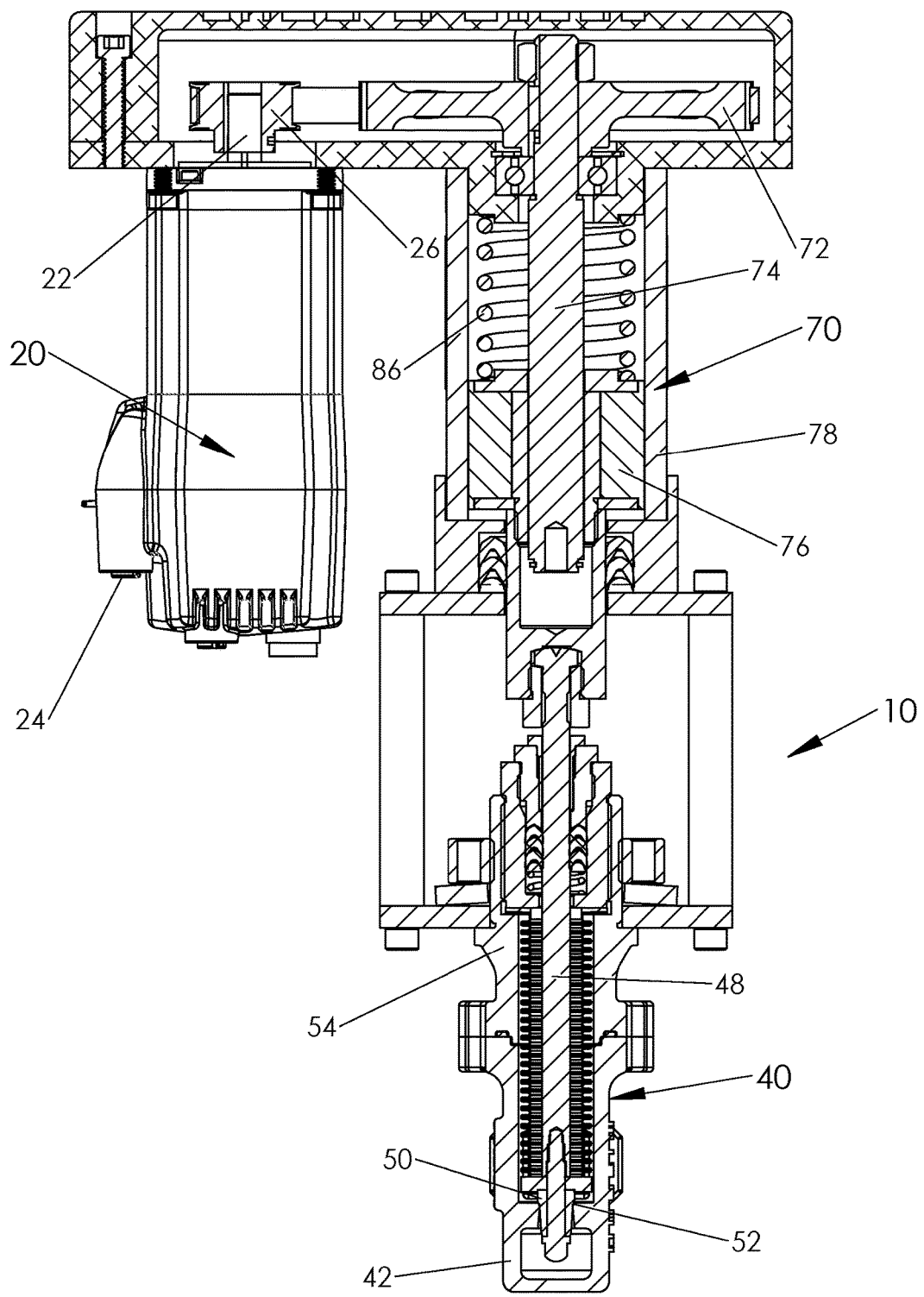
FIG. 1 is a side-sectional elevation view of a digital flow control valve incorporating the inventive concepts, viewed along an axis in which the gas flow occurs.
Figure 2:
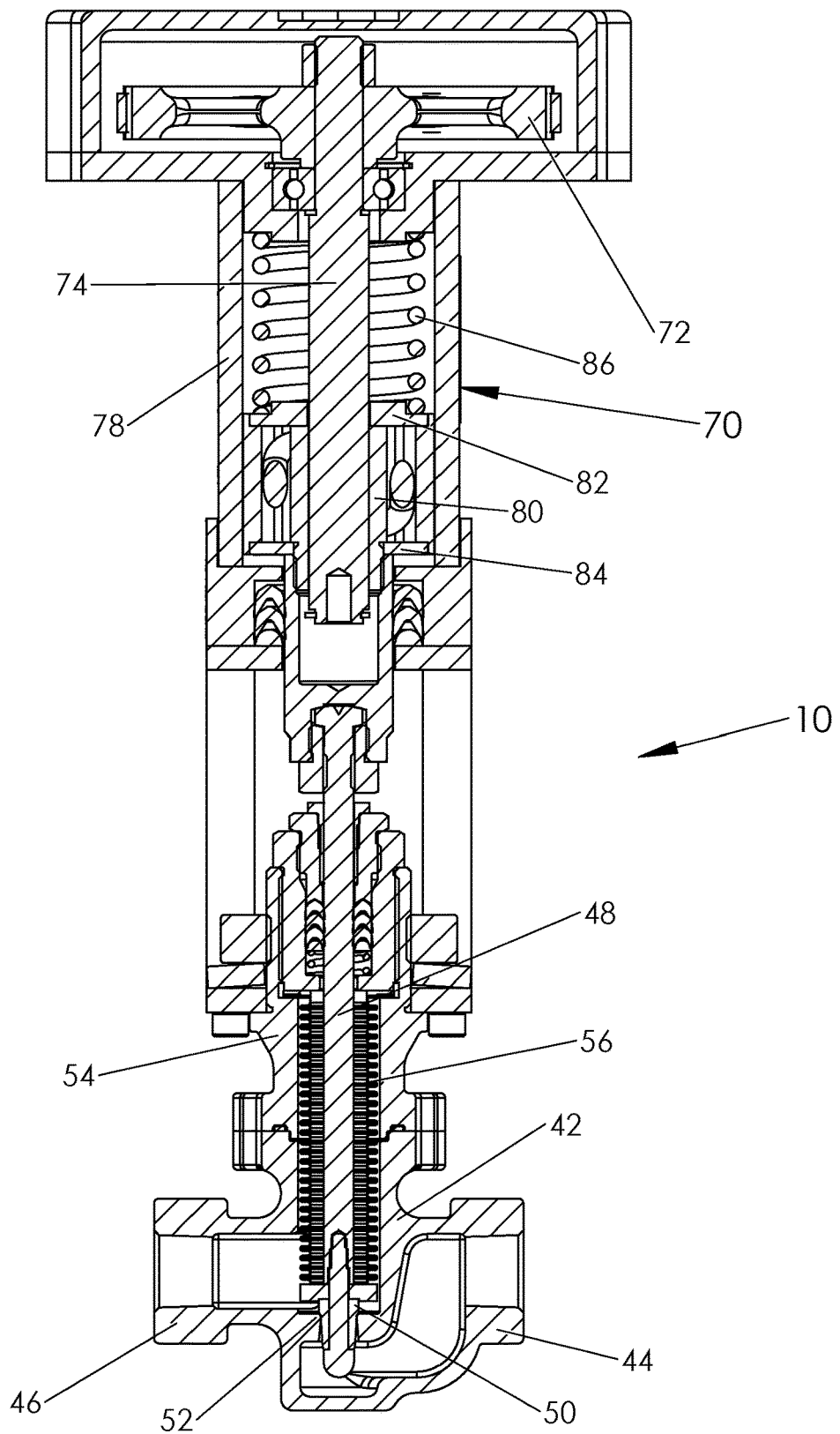
FIG. 2 is a side-sectional elevation view the digital flow control valve of FIG. 1, viewed along an axis normal to the axis of FIG. 1.

FIGS. 1 and 2 show an assembled digital flow control valve 10 that incorporates the inventive concept. Speaking generally at first, the device 10 has a smart motor 20, a valve 40 that is an operated by the smart motor and an actuator 70 that effects the interface between the smart motor and the valve. FIG. 1 shows the device 10 as viewed down an axis of flow of the medium moving through valve 40, which will be referred to as the "end" view. FIG. 2 shows the same device 10, with the sectional cut made across the axis of flow, so it will be referred to the "side" view.

The term "smart motor" as used here means a motor such as a brushless DC motor, a Servo motor or a Stepper motor, any of which would be provided with an encoding device with feedback position control. The smart motor would also have a processor programmed to perform specific moves, perform valve functions and to provide real-time feedback to a controller that is operating the equipment with which the digital flow control valve is associated.

In a typical embodiment, the smart motor motor 20 will be a hybrid stepper motor with an integrated drive controller (module/encoder). However, other embodiments can use a true servo motor. Similarly, any of the motors selected could use a separate controller module instead of the integrated drive controller. A commercially-available smart motor would be useful in this application and it can operate at either 24 or 48 volts of direct current. Typically, such a smart motor 20 will divide one rotation of its output shaft 22 into as many as 200 steps. The typical smart motor 20 anticipated to be used in this application will receive, at an input port 24, a signal that can come from any of a variety of sources, such as, for purposes of illustration only, an analog source, a digital step and direction, Ethernet, Ethernet/IP, ProfiNet, Modbus TCP, EtherCat, CANopen, RS-485 or internally pre-programmed routines. While a digital signal is clearly preferred, the analog source, when used, could come from a variety of means, including 0-20 mA, 4-20 mA, 0-10 volts or 0-24 volts. To provide continued operation in the event of a power loss, preferred embodiments of the smart motor 20 would be supplied with a battery back-up or capacitor. The smart motor 20 will be in communication with a controlling computer (not shown) of the rubber-molding machine through the input port 24 and will translate input signals into rotation of output shaft 22, which is shown in the figures, as being topped by a gear 26 that is operatively engaged with the linear actuator 70. As FIG. 2 is taken from a position at the right side of FIG. 1, the smart motor and its appurtenant features are not visible in FIG. 2.

Directing attention now to the valve 40, the valve body 42 has an inlet portion 44 and an outlet portion 46 that are aligned horizontally, the respective portions defining a flow conduit. The inlet and outlet are typically provided with an appropriate means for engaging steam pipe, such as NPT threading, although other engaging means, such as a flange, is within scope of the inventive concept. The valve 40 depicted is arranged as a "normally closed" or "NC" type of valve in which a vertically-oriented stem 48 has, at a first end, a seal 50 that is normally resting against a seat 52 that separates the inlet and outlet portions 44, 46. The seal 50 will be typically formed of a molded thermal plastic so that it is able to tightly fit against the seat 52. Depending upon the particular application, one might select a valve that is arranged for "normally open" operation, as this becomes simply a matter of design choice.

The end of valve stem 48 opposite the seal 50 extends out of the valve body 42 and through a bonnet 54 that is adapted for maintaining its integrity under steam pressure, such as with a bellows seal 56 with backup or redundant packing. Typically, the bonnet 54 is bolted to the valve body 42. The portion of valve stem end 48 that is outside the valve body 42 is adapted for a quick-release connection to the actuator 70.

As best seen in FIG. 1, the actuator 70 converts rotation of the output shaft 22 into linear movement of the valve stem 48. Gear 26 on the top of output shaft 22 is engaged with gear 72, which rotates shaft 74. As shaft 74 rotates, an engagement with bushing 76 provides relative axial movement, and the connection of the bushing with valve stem 48 allows axial movement of seal 50 in the valve body 42.

In particular, the depicted embodiment bushing 76 is a rectangular bushing that is machined from DELRIN material, allowing it to be self-lubricated and wear-resistant. The rectangular shape, which is fitted in a rectangular housing 78, provides an inherent resistance to rotation. The engagement of the bushing 76 with the shaft 74 is achieved, in the depicted embodiment, by a recirculating ball nut 80, which is locked into the bushing by upper and lower ball nut flanges 82, 84, preferably made of 316 stainless steel. The bushing 76 is biased in the direction towards the valve body 42 by spring 86, located inside the housing 78. The bias provided by spring 86 would close valve 40 in the event of a loss of power to smart motor 20. As this spring 86 is progressively compressed, the smart motor 20 is required to provide progressively higher amounts of torque, which can be, as an output signal of the smart motor, to assist in control of the device 10.

In the prior art, hydraulic pressure from a compressed air supply was used to move a pneumatic actuator to effect movement of the valve stem. One known difficulty with such a pneumatic actuator is that the springs and diaphragms in the actuator will change in performance over time and in varying environmental conditions. Further, the hydraulic signal in the compressed air supply, which is an analog signal, can vary. While the signal sent to the actuator can be monitored, there is no direct feedback provided to the controller. Only through a separate (and relatively inaccurate) measure of the valve stem's position can the position of the seal in the valve body be measured.

By way of contrast, the smart motor 20 used in the inventive concept is connected to the controller by a bi-directional digital communication that can be achieved through direct connection or by a wireless means. When the digital signal is received, a feedback signal from the smart motor 20 can provide the controller with an extremely accurate measure of the position of the valve stem, and, especially, it can provide an accurate measure of the distance of the seal 50 from a fully-closed position. For example, in an exemplary embodiment, the number of available positions of the smart motor 20 permits an accuracy of the valve stem position of up to $1.2 \times 10^{-5}$ inches. This is achieved, at least in one exemplary embodiment, by using a smart motor 20 that has 4000 stepped positions per rotation and 41,000 positions per 0.5 inches of linear motion from the actuator 70. In this way, control of the steam being supplied through the valve 40 can be accurately monitored. This may be very useful in applying a curing program to the curing mold, as the program can be closely replicated from one cycle to the next. In particular, step changes in the valve operation are much more quickly and effectively implemented. Even further, the servo motor settings that are required to obtain the desired steam flow and pressure in the mold from cycle to cycle can be accurately monitored. In this way, the substitution of the device 10 of the inventive concept adds an additional control point in the automation of a curing mold. While the device 10 is described as being used in control of a steam inlet valve, application to many other valves in the curing mold can be readily anticipated, such as, for purpose of example only, a steam or condensate outlet valve. With full application of the inventive concept, an "airless" curing mold, that is, one that does not rely upon pneumatic control, can be achieved.

Figure 3:
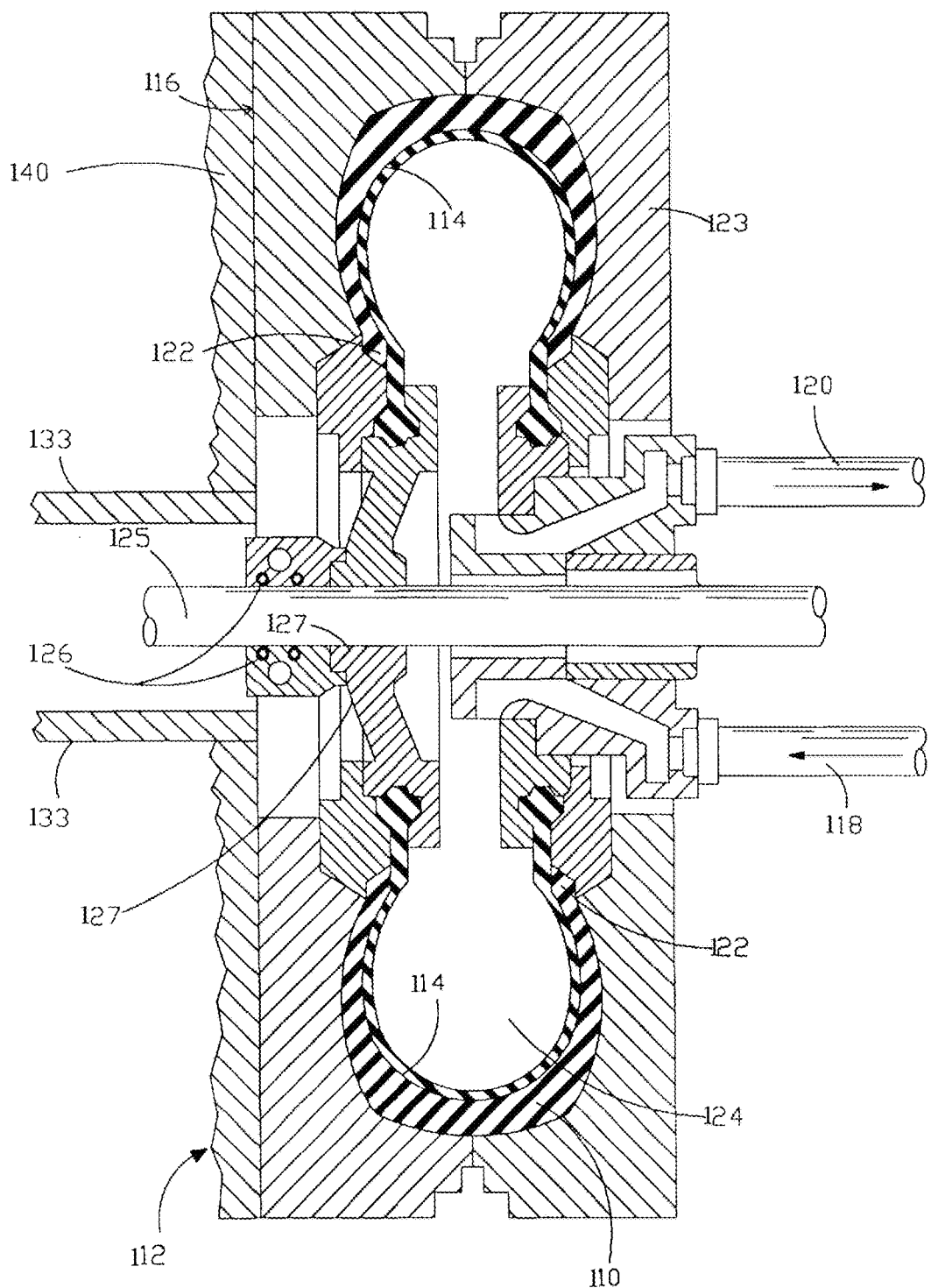
FIG. 3 is a side sectional view of a prior art tire curing press in which the digital flow control valve of FIG. 1 is used.

The ability to control operation of tire curing presses is an on-going quest, although the general structure of a tire curing press is well-established. As an example, FIG. 3 is a representation of a typical tire curing device 112, as shown in U.S. Pat. No. 6,401,524. The curing device 112 has an expansion vessel 114 that inflates when a pressurized fluid is introduced into its interior. The figure shows the expansion vessel 114 in its inflated form, confined in a tire mold 116. In a typical curing device 112, the inflated expansion vessel 114 forces the elastomeric article tightly against mold 116. While the pressurized expansion vessel 114 holds the elastomeric article against the mold 116, the elastomeric article is shaped by the mold and is heated to cause curing. The heat may be introduced via the mold 116 or via the pressurized fluid. Typically, steam is used as both a pressurized fluid and a heat source for at least a portion of the cure time.

The illustrated mold 116 is a two piece mold (lower mold portion 123 is shown in FIG. 3) that separates for the removal of a cured elastomeric article, and insertion of an uncured elastomeric article. The pressurized fluid is introduced into the expansion vessel 114 through an inlet channel 118, and exits through an exit channel 120. The inlet channel 118 and the exit channel 120 contain valves which work together to regulate the pressure within the expansion vessel 14. One such valve is the device 10 as described above, which, although not shown in FIG. 3, would typically be arranged to control flow into inlet channel 118.

In the curing of a tire 110, an uncured tire 110 is placed into a curing device 112 having an expansion vessel 114. The uninflated expansion vessel 114 is located radially inwardly of the beads 122 of the tire 110. After the mold 116 is closed, steam is introduced into the expansion vessel 114, which inflates. As this occurs, at least a portion of it enters into a cavity 124 in the tire 110. Ideally, the expansion vessel 114 will occupy the entire cavity 124 and contact the surface within the cavity 124, pushing the tire 110 against the mold 116. Generally, the surface within the cavity 124 that is contacted by the expansion vessel 114 is the inner liner of the tire 110. The pressurized fluid is contained within the expansion vessel 114 for a predetermined period of time so that the tire 110 may at least partially cure. In most instances, the heat source is removed prior to deflating the expansion vessel 114. The steam, which acts as the heat source and the pressurized fluid, is slowly released out of the expansion vessel 114 and is replaced by another pressurized fluid, such as nitrogen. After a predetermined time has elapsed, the pressurized fluid is released from the expansion vessel 114 into the exit channel 120. As a result, the expansion vessel 114 is deflated and is withdrawn from the cavity 124. Finally, the mold 116 is opened and the at least partially cured tire 110 is removed from the curing device.

In the illustration, a bolster screw 133 is located near the center post 125 which raises and lowers expansion vessel 114 when the mold 116 is used to cure a tire. This center post 125 passes through the middle of expansion vessel 114, which is typically an elastomer/fabric composite bag. The top, open end of the composite bag is gathered by top ring 127, which fits over center post 25.

The mold 116 operates by inserting a tire, which is to be cured into the mold when the expansion vessel 114 is deflated, and the center post 125 is retracted toward the lower portion of the mold. When a tire has been placed into the mold, an upper portion of the mold is pressed down over a lower mold portion, and the mold is activated by inflating the expansion vessel 114 with steam, and pushing center post 125 toward bolster screw 133. O-rings 126, located in top ring 127, seal the expansion vessel 114 against center post 125 to prevent the escape of steam at center post 125. Platen 140 is used to apply pressure to the top of the mold, to hold the two mold portions together while the tire is subjected to high pressure, which pushes the tire into the mold, creating a molded pattern on the cured product.

Since problems with the expansion vessel 114 are a significant cause of tires that are defectively cured and must be scrapped, the ability of the device 10 to accurately set the flow of the pressurizing medium into the expansion vessel, and to monitor the condition of the expansion vessel by providing feedback to a central controller that monitors a plurality of curing devices 112, the device 10 improves the operation of the individual curing devices, by monitoring the coarse operation of the device 10, trending operating of the device and creep of valve positioning over time, as well as the ability to provide comparison among the plurality of curing devices.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A flow control device, arranged for digital operation from a controller, comprising:
    a valve body, having a fluid input and a fluid output that define a flow conduit through the valve body, the flow conduit having a seat formed along the flow conduit;
    a valve stem, having a first end positioned inside the valve body in the flow conduit and a second end extending out of the valve body at a valve bonnet that seals the flow conduit;
    a seal arranged at the first end of the valve stem for movement toward and away from a sealing relationship with the valve seat;
    a smart motor, in bi-directional digital communication with the controller to receive an input signal for setting the position of the seal relative to the valve seat and for sending output signals to the controller, the smart motor acting to rotate an output shaft with a gear to a position determined by the input signal; and
    an actuator, enclosed in a rectangular housing and arranged between the smart motor and the valve body to translate rotation of the output shaft into rotation of an actuator shaft against a biasing force provided by a spring arranged to move the actuator shaft to a predetermined default position in the event of loss of power to the smart motor, with the actuator shaft transferring the rotation to axial movement of a rectangular bushing, an end of which extends out of the actuator housing;
    wherein the bushing end and the second end of the valve stem are coupled outside of both the valve body and the actuator housing for axial movement of the valve stem; and
    wherein the second end of the valve stem is decouplable from the bushing end without opening the actuator housing.

2. The device of claim 1, wherein the actuator shaft has a gear that engages the output shaft gear and rotates the actuator shaft.

3. The device of claim 2, wherein the bushing is positioned in the actuator housing with a shape to allow axial movement and to resist rotation of the bushing in the housing, the bushing further having a recirculating ball nut that engages the actuator shaft, with the recirculating ball nut locked into the bushing by a pair of ball nut flanges.

4. The device of claim 2, wherein the spring biases the valve stem by directly acting on the bushing in the actuator housing.

5. The device of claim 1, wherein the smart motor is a stepper motor.

* * * * *